(12) United States Patent
Pavon et al.

(10) Patent No.: US 11,657,063 B2
(45) Date of Patent: May 23, 2023

(54) BEHAVIORAL ANALYTICS IN INFORMATION TECHNOLOGY INFRASTURCTURE INCIDENT MANAGEMENT SYSTEMS

(71) Applicant: BMC SOFTWARE, INC., Houston, TX (US)

(72) Inventors: Raul Pavon, Houston, TX (US); Beth Carpenter, Houston, TX (US); Gwendolyn Curlee, Houston, TX (US)

(73) Assignee: BMC Software, Inc., Houston, TX (US)

( * ) Notice: Subject to any disclaimer, the term of this patent is extended or adjusted under 35 U.S.C. 154(b) by 220 days.

(21) Appl. No.: 15/476,694

(22) Filed: Mar. 31, 2017

(65) Prior Publication Data
US 2018/0285433 A1    Oct. 4, 2018

(51) Int. Cl.
*G06F 16/25*     (2019.01)
*H04L 41/142*   (2022.01)
*G06F 16/2458*  (2019.01)
*G06F 16/36*    (2019.01)
*G06F 40/205*   (2020.01)

(52) U.S. Cl.
CPC ........ *G06F 16/258* (2019.01); *G06F 16/2462* (2019.01); *G06F 16/36* (2019.01); *G06F 40/205* (2020.01); *H04L 41/142* (2013.01)

(58) Field of Classification Search
CPC .... G06F 16/258; G06F 16/36; G06F 16/2462; G06F 40/205; H04L 41/142
See application file for complete search history.

(56) References Cited

U.S. PATENT DOCUMENTS

| | | | | |
|---|---|---|---|---|
| 9,497,136 | B1* | 11/2016 | Ramarao | G06F 9/45558 |
| 2007/0206770 | A1* | 9/2007 | Yamanaka | H04M 3/5233 379/265.01 |
| 2007/0261017 | A1* | 11/2007 | Sanghvi | G06F 9/44526 717/100 |

(Continued)

*Primary Examiner* — Hosain T Alam
*Assistant Examiner* — Anthony G Gemignani
(74) *Attorney, Agent, or Firm* — Brake Hughes Bellermann LLP (57) ABSTRACT

A computer system for behavioral analytics of native Information Technology Service Management (ITSM) incident handling data includes a processor, a memory, a de-normalized target data source for behavioral analysis, a transformation processor, and a statistical processor. The transformation processor reads an identified portion of the ITSM data and creates new normalized fields for the de-normalized target data source by parsing selected text fields from the portion of ITSM data. The created new normalized fields include a working group field and an associated support level field. The transformation processor further creates new de-normalized aggregation fields for the incipient de-normalized target data source based on the newly created normalized fields. The newly created de-normalized aggregation fields include fields characterizing incident handling behavior. A statistical processor further processes target data for behavioral analytics. The transformation processor populates the target data source's de-normalized data fields with aggregated incident handling data and behavioral characterizations.

18 Claims, 10 Drawing Sheets

(56) References Cited

U.S. PATENT DOCUMENTS

| | | | |
|---|---|---|---|
| 2009/0198641 A1* | 8/2009 | Tortoriello | G06N 7/02 |
| | | | 706/52 |
| 2010/0274616 A1* | 10/2010 | Grace | G06Q 10/063 |
| | | | 705/7.11 |
| 2012/0323640 A1* | 12/2012 | Sabharwal | G06Q 10/06398 |
| | | | 705/7.39 |
| 2014/0025417 A1* | 1/2014 | Appel | H04M 3/5238 |
| | | | 705/7.15 |
| 2014/0059395 A1* | 2/2014 | Mahindru | G06F 11/07 |
| | | | 714/48 |
| 2016/0036652 A1* | 2/2016 | Bellini, III | G06F 9/44 |
| | | | 709/223 |
| 2016/0232230 A1* | 8/2016 | Radivojevic | G06F 16/287 |
| 2017/0031943 A1* | 2/2017 | Cohen | G06Q 10/06395 |

* cited by examiner

Help Desk System – Log Entry

| Log File | | |
|---|---|---|
| Chronological Dates | Log Entries | Assigned Individual |
| t1 | Log 1 | Person 1 |
| t2 | Log 2 | Person 2 |
| t3 | Log 3 | Person 3 |
| t4... | Log 4... | Person 4.... |

Level I & II Aggregation and Summation Preparation

Per Unique Entry ← 310

| Row | Chronological Date | Time Between Activity Entries | Priority | Activity Status | Assigned Group | Assigned Individual | Assigned Group Costing Category |
|---|---|---|---|---|---|---|---|
| r | t | c | p | as | wg | wi | wgc |
| 1 | t1 | | Critical | Transfer | † wg1 | * wi1 | Low |
| 2 | t2 | t2 – t1 | High | Transfer | † wg2 | * wi2 | Top |
| 3 | t3 | t3 – t2 | Medium | Transfer | † wg3 | * wi3 | Medium |
| 4 | t4 | t4 – t3 | Medium | Working | wg3 | * wi4 | Medium |
| 5 | t5 | t5 – t4 | Medium | On Hold | wg3 | wi4 | Medium |
| 6 | t6 | t6 – t5 | Medium | Transfer | † wg4 | wi4 | High |
| 7 | t7 | t7 – t6 | Medium | Working | wg4 | * wi5 | High |
| 8 | t8 | t8 – t7 | Medium | ‡ Concluded | wg4 | * wi6 | High |
| 9 | t9 | t9 – t8 | Medium | Assigned | wg4 | wi6 | High |
| 10 | t10 | t10 – t9 | Medium | ‡ Concluded | wg4 | wi6 | High |
| 11 | t11 | t11 – t10 | | Final | | | | t: date time stamp when the activity occurred.

c: the difference between the next activity and the current activity.

p: priority of the activity from least to most importance.

as: activity status wg: the group of individuals assigned the activity.

wi: the individual performing the activity.

wgc: ranking the Assigned groups from least costly to most costly.

Footnotes 320

† 4 distinct assigned groups
‡ 2 conclusions, indicating rework
• 6 distinct assigned individuals
assigned group escalation order: low, top. medium, high
: first transfer time

Level III Work/Waste/Wait Calculations

Per Unique Entry

| | | | Total Work Time | | | Total Wait Time | | | Data from table 300 | |
|---|---|---|---|---|---|---|---|---|---|---|
| Row | Chronological Date | Time Between Activity Entries | Original Work Time | ReWork Time | Service Wait Time | Unserviceable Wait Time | Activity Status | Working Group | Working Group Costing Category | |
| r | t | c | d | e | f | g | as | wg | wgc | |
| 1 | t1 | | a | | | (t2 – t1) – a | Transfer | wg1 | Low | t: date time stamp when the activity occurred. |
| 2 | t2 | t2 – t1 | a | | | (t3 – t2) – a | Transfer | wg2 | Top | c: the difference between the next activity and the current activity. |
| 3 | t3 | t3 – t2 | a | | | (t4 – t3) – a | Transfer | wg3 | Medium | |
| 4 | t4 | t4 – t3 | t5 – t4 | | | | Assigned | wg3 | Medium | a: acceptable work constant per activity status = transfer |
| 5 | t5 | t5 – t4 | | | t6 – t5 | | On Hold | wg4 | Medium | |
| 6 | t6 | t6 – t5 | | | | (t7 – t6) – a | Transfer | wg4 | High | b: acceptable work constant per activity status = final conclusion |
| 7 | t7 | t7 – t6 | t8 – t7 | | | | Assigned | wg4 | High | as: activity status |
| 8 | t8 | t8 – t7 | a | | | | Concluded | wg4 | High | wg: the group of individuals assigned the activity. |
| 9 | t9 | t9 – t8 | | t9 – t8 | | | Assigned | wg4 | High | |
| 10 | t10 | t10 – t9 | | t10 – t9 | | | Concluded | wg4 | High | wgc: ranking the Assigned groups from least costly to most costly. |
| 11 | t11 | t11 – t10 | b | | | | Final | | | |

← 410

Activity Status = Not Concluded

| Working Group Costing Category | Time Interval(s) | Duration | Total Work Time | Original Work Time | ReWork Time | Service Wait Time | Unserviceable Wait Time | Total Wait Time |
|---|---|---|---|---|---|---|---|---|
| Total | | sum(c) | sum(d) + sum(e) | sum(d) | sum(e) | sum(f) | sum(g) | sum(f) + sum(g) |
| Low | t1 | Sum(c1) | Sum(d1:e1) | Sum(d1) | | | Sum(g1) | Sum(f1:g1) |
| Medium | t3:t5 | Sum(c3:c5) | Sum(d3:e4) | Sum(d3:d4) | | Sum(f5) | Sum(g3:g5) | Sum(f3:g5) |
| High | t6:t10 | Sum(c6:c10) | Sum(d6:e10) | Sum(d6:d7) | Sum(e8:e10) | | Sum(g6) | Sum(f6:g10) |
| Top | t2 | Sum(c2) | Sum(d2:e2) | Sum(d2) | | | Sum(g2) | Sum(f2:g2) |

← 410

Activity Status = Concluded

| | Total Waste Time | Work Waste Time | Wait Waste Time |
|---|---|---|---|
| total sums | sum(d) + sum(e) sum(f) + sum(g) | sum(d) + sum(e) | sum(f) + sum(g) |
| | Sum(d1:g1) | Sum(d1:e1) | Sum(f1:g1) |
| | Sum(d3:g5) | Sum(d3:e4) | Sum(f3:g5) |
| | Sum(d6:g10) | Sum(d6:e10) | Sum(f6:g10) |
| | Sum(d2:g2) | Sum(d2:e2) | Sum(f2:g2) |

Table 400

Outcome – Rapid detection of process inefficiencies:

| | Duration (Count) | Work / Cost $ | Waste / Cost $ | Wait / Cost $ | Supt Tier / Total Cost |
|---|---|---|---|---|---|
| Americas Client Services | 977,284 | | | | |
| Assigned (1) | 977,284 | 60 / 0.58 | 977,224 / 9,498.62 | 0 / 0.00 | |
| | | 60 / 0.58 | 977,224 / 9,498.62 | 0 / 0.00 | High / 9,499.20 |
| Cloud Frontiers | 24,244 | | | | |
| Assigned (1) | 10,129 | 180 / 1.75 | 9,949 / 96.70 | 0 / 0.00 | |
| Pending (3) | 14,115 | 0 / 0.00 | 0 / 0.00 | 14,115 / 137.20 | |
| | | 180 / 1.75 | 9,949 / 96.70 | 14,115 / 137.20 | High / 235.65 |
| Cloud Services | 2,649 | | | | |
| Assigned (1) | 2,649 | 60 / 1.50 | 2,589 / 64.73 | 0 / 0.00 | |
| | | 60 / 1.50 | 2,589 / 64.73 | 0 / 0.00 | Lead / 66.23 |
| Enterprise WINTEL Applications | 3,057 | | | | |
| Assigned (1) | 3,057 | 60 / 0.58 | 2,997 / 29.13 | 0 / 0.00 | |
| | | 60 / 0.58 | 2,997 / 29.13 | 0 / 0.00 | High / 29.71 |
| Global Networking | 800 | | | | |
| Assigned (1) | 800 | 60 / 0.58 | 740 / 7.19 | 0 / 0.00 | |
| | | 60 / 0.58 | 740 / 7.19 | 0 / 0.00 | High / 7.78 |
| India IS | 908,560 | | | | |
| Assigned (1) | 729,625 | 300 / 2.92 | 729,525 / 7,090.98 | 0 / 0.00 | |
| Closed (5) | 0 | 0 / 0.00 | 0 / 0.00 | 0 / 0.00 | |
| In Progress (2) | 178,675 | 178,675 / 1,736.72 | 0 / 0.00 | 0 / 0.00 | |
| Resolved (4) | 60 | 60 / 0.58 | 0 / 0.00 | 0 / 0.00 | |
| | | 179,035 / 1,740.22 | 729,525 / 7,090.98 | 0 / 0.00 | High / 8,831.20 |
| IT Frontier | 529 | | | | |
| Assigned (2) | 529 | 120 / 0.50 | 409 / 1.70 | 0 / 0.00 | |
| | | 120 / 0.50 | 409 / 1.70 | 0 / 0.00 | Medium / 2.20 |
| IT Cloud Enablement | 348,872 | | | | |
| Assigned (1) | 672 | 60 / 1.50 | 612 / 15.30 | 0 / 0.00 | |
| In Progress (2) | 348,200 | 348,200 / 8,705.00 | 0 / 0.00 | 0 / 0.00 | |
| | | 348,260 / 8,706.50 | 612 / 15.30 | 0 / 0.00 | Lead / 8,721.80 |
| Network Operations Center | 76,259 | | | | |
| Assigned (1) | 76,259 | 60 / 0.17 | 76,199 / 211.07 | 0 / 0.00 | |
| | | 60 / 0.17 | 76,199 / 211.07 | 0 / 0.00 | Low / 211.24 |
| Service Desk | 6,739 | | | | |
| Assigned (1) | 6,739 | 300 / 1.25 | 6,439 / 26.78 | 0 / 0.00 | |
| | | 300 / 1.25 | 6,439 / 26.79 | 0 / 0.00 | Medium / 28.03 |
| | 2,348,993 | 528,195 / 10,453.63 | 1,806,683 / 17,042.21 | 14,115 / 137.20 | |

BEHAVIORAL ANALYTICS IN INFORMATION TECHNOLOGY INFRASTURCTURE INCIDENT MANAGEMENT SYSTEMS

TECHNICAL FIELD

This description relates to data mining of incident handling logs in an information technology infrastructure.

BACKGROUND

Information technology (IT) infrastructure refers to the set of hardware, software, network resources and services required for the existence, operation and management of an organization's IT environment. The IT infrastructure allows the organization to deliver IT solutions and services (e.g., applications) to its employees, partners and/or customers.

IT Service Management (ITSM) is a general term that describes approaches for designing, delivering, managing and improving the way information technology (IT) is used within an organization. The goal of ITSM is to ensure that the right processes, people and technology are in place so that the organization can meet its business goals. In example implementations, ITSM may be implemented under an Information Technology Infrastructure Library (ITIL) framework, which may standardize the selection, planning, delivery and support of IT services. The services provided under the ITIL framework may include incident management or incident handling processes (e.g., incident identification, logging, categorization, prioritization, escalation, diagnosis, resolution, closure, etc.) that can be used (e.g., by a service desk or support staff) to manage the lifecycle of an incident (e.g., an unplanned interruption to, or quality reduction of, an IT service). Incident management focuses solely on handling and escalating incidents as they occur to restore defined service levels. Incident management may not deal with root cause analysis or problem resolution. The main goal is to take user incidents from a reported stage to a closed stage. Incident management has close relationships with and dependencies on other service management processes, including change management, problem management, service asset and configuration management, service level management, etc.

Consideration is now being given to systems and methods for behavioral analytics of incident handling in an IT infrastructure installation.

SUMMARY

A computer system for behavioral analytics of native Information Technology Service Management (ITSM) data is described herein. The ITSM data may be normalized data in formats that are consistent with Information Technology Infrastructure Library (ITIL) framework or other standards.

In a general, aspect the computer system includes a processor, a memory, a de-normalized target data source and a transformation processor coupled to a statistical processor.

In an aspect, the transformation processor in conjunction with the statistical processor begins constructing the de-normalized target data source by identifying a portion of native ITSM data including incident handling data for behavioral analysis.

In another aspect, the transformation processor in conjunction with the statistical processor reads each line in the identified portion of the native ITSM data and creates new normalized fields for an incipient de-normalized target data source by parsing selected text fields from the portion of native ITSM data. The newly created normalized fields include a working group field and an associated support level field.

In another aspect, the transformation processor in conjunction with the statistical processor may aggregate the incident handling data to list working groups under the working group field and list support levels under the associated support level field.

In yet another aspect, the transformation processor in conjunction with the statistical processor, for each incident, creates new de-normalized aggregation fields for the incipient de-normalized target data source based on the new normalized fields, and after aggregating the incident handling data, for each incident and each support tier, creates new de-normalized fields in the incipient de-normalized target data source characterizing incident handling behavior.

In a further aspect, the transformation processor in conjunction with the statistical processor, analyzes the aggregated incident handling data to determine behavioral characteristics, and populates the target data source's de-normalized data fields with the aggregated incident handling data and behavioral characteristics.

The details of one or more implementations are set forth in the accompanying drawings and the description below. Other features will be apparent from the description and drawings, and from the claims.

BRIEF DESCRIPTION OF THE DRAWINGS

FIG. 3 is an illustration of an example de-normalized data table that describes episodes of handling an incident, in accordance with the principles of the present disclosure.

FIG. 8 is an example view or report of process inefficiencies that may be more rapidly obtained from a de-normalized target data source than from native ITSM data, in accordance with the principles of the present disclosure.

DETAILED DESCRIPTION

Information technology (IT) infrastructure refers to the set of hardware, software, network resources, and services required for the existence, operation and management of an organization's IT environment (hereinafter "IT infrastructure installation"). The IT infrastructure installation may include physical, virtual, and cloud systems. The IT infrastructure installation may allow the organization to deliver IT solutions and services (e.g., applications) to users. The IT infrastructure installation may include, or be coupled to, an IT Service Management (ITSM) system that includes, for example, processes for incident handling and resolution. ITSM system may, for example, include monitoring agents or tools (e.g., server monitoring tools, application monitoring tools, network monitoring tools, storage monitoring tools, etc.) that monitor the state, activities, and performance of components (e.g., servers, applications, networks, etc.) of the IT infrastructure installation in operation. The IT infrastructure monitoring tools may automatically collect or log data on the state, activities and performance of the components of the IT infrastructure installation, and report the data in a real-time or near real-time stream of messages. The messages may, for example, include alphanumeric text content describing events or incidents in the operation of the IT infrastructure installation.

An IT infrastructure installation may generate massive or voluminous amounts of the machine-generated messages (which may include routine log data). For example, log data can reach hundreds of gigabytes of data per day for a typical IT infrastructure installation of a large organization. Simply collecting, centralizing, and storing data at this volume can be challenging. Furthermore, an administrator may find it difficult, if not impossible, to parse through the large volumes of the machine-generated messages to glean or extract meaningful behavioral insights into the underlying processes that the machine-generated messages represent.

Systems and methods described herein provide computer tools for behavioral analytics of the voluminous machine-generated messages of an IT infrastructure installation. In the context of incident management over the lifecycles of incidents in the IT infrastructure installation, the behavioral analytics may relate to service desk or support staff behaviors in incident handling in the ITSM system. The behavioral insights may answer questions such as: "Where is the bottleneck in incident handling?" and "Was there a services slowdown in the IT infrastructure?"

The behavioral analytics of incident management data that are described herein may be based on using behavioral concepts (e.g., "work," "wait," and "waste") to categorize incident handling activities, in accordance with the principles of the present disclosure.

For convenience in description, the behavioral analytics may be referred to hereinafter as "work/wait/waste incident analysis." Further, the terms "incident management" and "incident handling" may be used interchangeably herein.

The ITSM data from diverse components or aspects of the IT infrastructure is the "native" ITSM data. The native ITSM data may have different fixed formats and content fields (i.e., the native ITSM data may be normalized). The native ITSM data, which can have hundreds of different attributes or fields, can be large in typical IT infrastructure installations.

A difficulty in behavioral analytics of native ITSM data is that the data can be large and complex to analyze. The behavioral analytics techniques described herein transform the large and complex incident management data by collecting, creating, enriching, and repackaging native ITSM data, which may have a large footprint, into a smaller footprint data package, in accordance with the principles of the present disclosure. The transformed small footprint data package (hereinafter "target data source") may be more easily accessed and consumed by a variety of mediums than the native ITSM data.

The behavioral analytics of the native ITSM data may involve de-normalizing portions the native ITSM data for inclusion in the target data source as de-normalized data (or in other words, "vectorized" data). Further, the target data source may, for example, be interfaced with other applications or systems (hereinafter "targets") as a digital service in an IT digital enablement (ITDE) environment. Automating the target data source may, for example, involve providing automated views of the analyzed ITSM data (e.g., stored as de-normalized tables in the target data source) to the targets.

Figure 1:
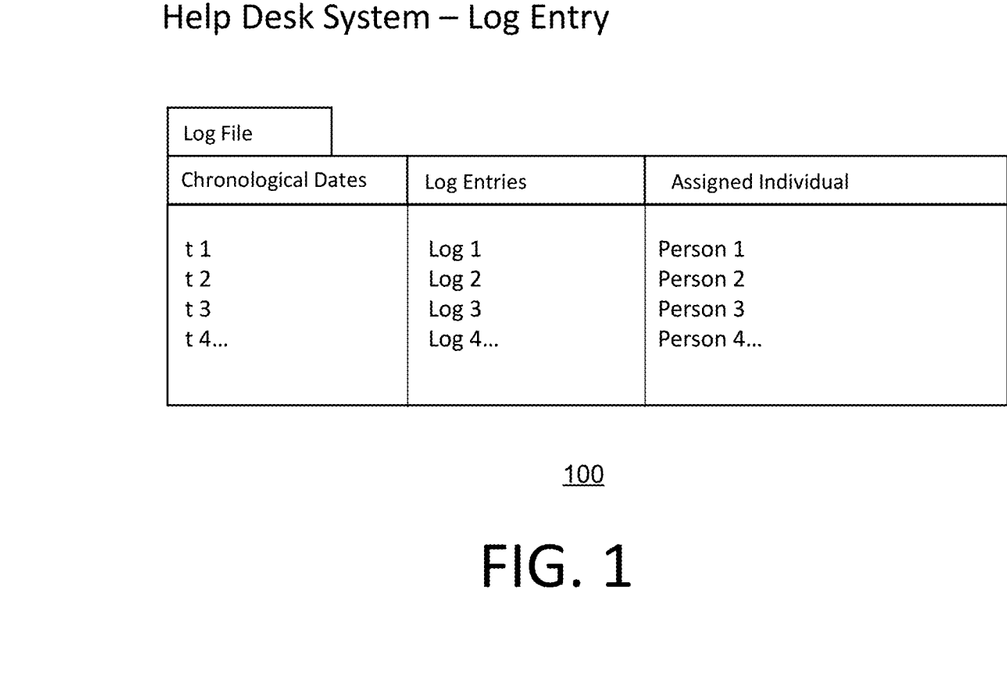
FIG. 1 is a schematic illustration of an Audit Log entry as a source of native ITSM data related to incident handling in an ITSM.

FIG. 1 is an example display page 100 of Help Desk System Log Entry, which illustrates the availability in the ITSM of native ITSM data related to, for example, incident handling. The incident handling data may be related (in one-to-one, or one-to-many relationships) to other native ITSM data categories such as customer surveys, relationships, audit log, work log, etc.

Figure 2:
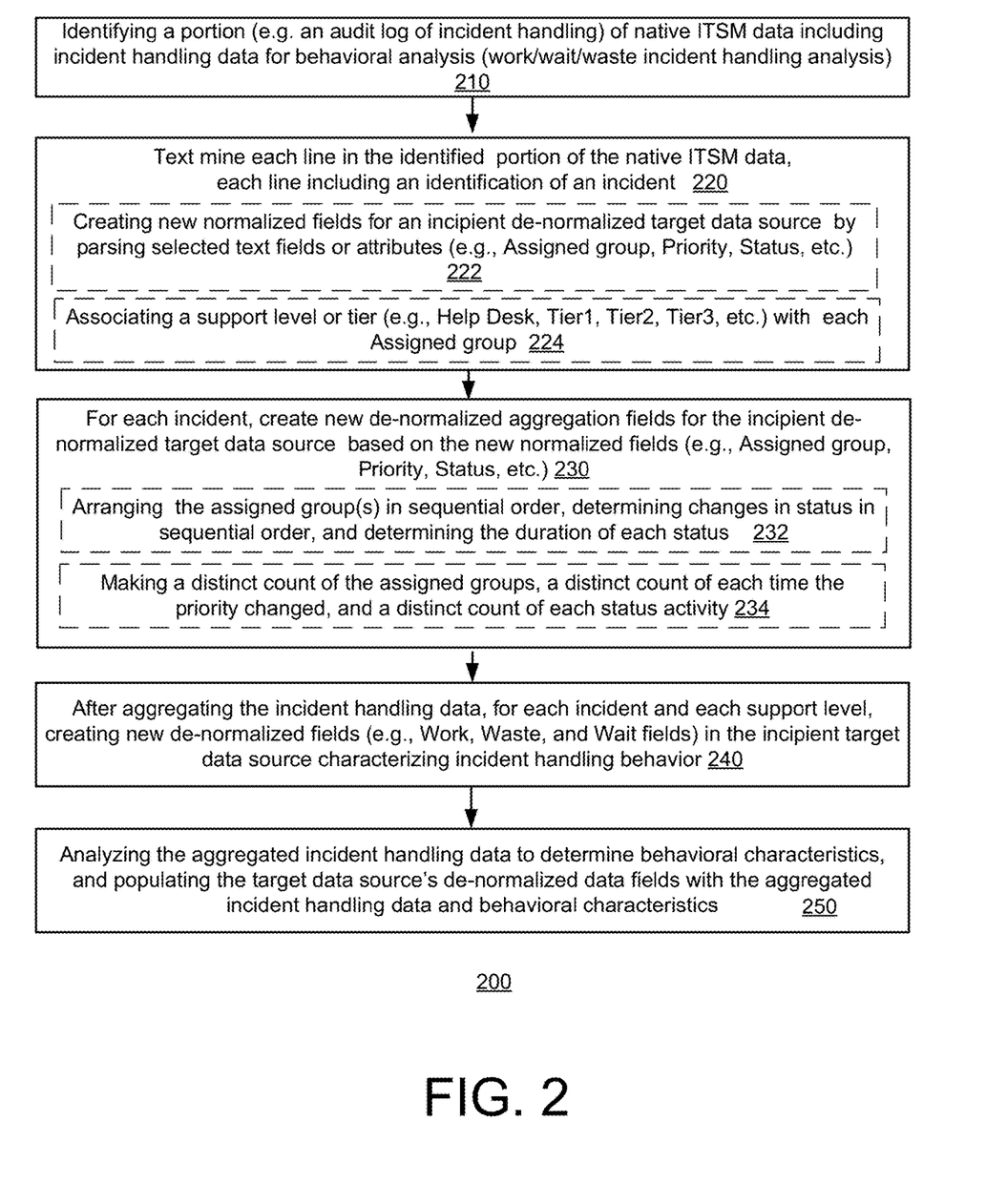
FIG. 2 is a flow chart illustration of an example computer-implemented method for behavioral analytics of incident management data, in accordance with the principles of the present disclosure.

FIG. 2 shows an example computer-implemented method 200 for behavioral analytics of incident management, in accordance with the principles of the present disclosure.

Method 200 may utilize behavioral concepts (e.g., of work, wait, and waste) to categorize incident handling processes (e.g., activities that may be supervised by support entities or help desk staff) in an ITSM. Method 200 may involve creating, and automating, a target data source that contains de-normalized and normalized ITSM data for both closed incident and active incident functions within the incident lifecycles processed by the ITSM system. The target data source may be referred to herein as the "de-normalized target data source," and when under development or construction referred to as the "incipient de-normalized target data source."

Method 200 may include different stages or levels (e.g., level zero, level one, level two, level three, and level four) directed to de-normalizing the incident handling data and assembling a target data source. The de-normalized incident data may be aggregated and summarized in the target data source to bring out behavioral characteristics or relationships of incident handling in the ITSM system.

At level zero, method 200 may include identifying a portion of native ITSM data including incident handling data for behavioral analysis (e.g., work/wait/waste incident handling analysis) (210). The native ITSM data may for example, include Incidents, Audit log, Relationships, and People data, etc. Method 200 may identify, for example, an incident handling data portion of the native ITSM data (e.g., an Audit log of incident handling) of native ITSM data for behavioral analysis as the subject data for the work/wait/ waste incident analysis. The subject data that is processed by method 200 may be referred to herein as the "Core" incident handling data.

As shown in FIG. 2, at level one, method 200 may include reading (e.g., text mining) each line in the identified portion of the native ITSM data (e.g., the Audit log of incident handling activities) (220). Each line in the Audit line log may include identification of an incident. Method 200 may further include, for each Audit log line, creating new normalized fields for the incipient target data source by parsing and extracting selected text fields or attributes (e.g., Working Group or Assigned Group, Priority, Status, etc.) (222). In example implementations, the Assigned Group value may be an agent or entity (e.g., support group) that is assigned responsibility for resolution of the incident. The Priority value may be an indicator of the relative importance or criticality of an incident. The Status may mirror the states of incident handling processes and include values such as "New", "Assigned", "In progress", "On hold or pending", "Resolved", "Closed", etc.

Method 200 may also include associating a support level or tier (e.g., "Help Desk", "Tier1", "Tier2", "Tier3", etc.) with each Assigned Group in the incipient target data source (224). The support levels or tiers (e.g., Help Desk, Tier1, Tier2, Tier3, etc.) may be associated with respective cost factors of providing support for incident handling.

In method 200, creating new normalized fields for the incipient target data source by parsing and extracting selected text fields or attributes 222 may include aggregating the incident handling data to list working groups under the working group field and list support levels under the associated support level field.

At level two, method 200 may include, for each incident, creating new de-normalized aggregation fields for the incipient target data source (230). The new de-normalized fields may be used to aggregate the Audit log incident data and may be referred to herein as the new "de-normalized aggregation fields". The new de-normalized aggregation fields may be based on the new normalized fields (e.g., "Assigned Group", "Priority", "Status", etc.) previously parsed and extracted from the audit log at level one of method 200, and further include new fields describing further attributes (e.g. temporal attributes) for each incident handling activity. These fields may for example, include "firsts" fields (e.g., assigned group, owner group, operational categories, priority, status, etc.), "lasts" fields (e.g., complementing the "firsts" fields), and "seconds" fields (e.g., "second" assigned group, "second" assigned time, etc.).

Method 200 may also include, in the incipient target data source, arranging the Assigned Group(s) in sequential order, determining changes in Status in sequential order, and determining the duration of each Status (232). Method 200 may further include making a distinct count of the Assigned Groups, a distinct count of each time the Priority changed, and a distinct count of each Status activity (234).

The new de-normalized aggregation fields, at level two, may also include fields based on relationships between the newly created fields and include a configuration item count (e.g., a count of the configuration items or components of the IT infrastructure involved or impacted by the incident).

FIG. 3 shows an example de-normalized data table that describes episodes of handling an incident. De-normalized data table may be included in the target data source. De-normalized data table 300 may be prepared by aggregating and summarizing Audit log data through level one and level two of method 200, in accordance with the principles of the present disclosure.

In de-normalized data table 300, data for each incident of episode handling may be entered as a unique entry (e.g., shown as a page of the table). De-normalized data table 300, for each unique entry, may include one or more de-normalized data aggregation fields 310 (e.g., Audit log fields such as Chronological Date, Time Between Activity Entries, Priority, Activity Status, Assigned Group, Assigned Individual, Assigned Group Costing Category) that are shown, for example, as column headings in FIG. 3. The data in the Audit log fields under the heading Chronological Date shows respective time stamps (e.g., t1, t2, t3, . . . , t11) for the start of each episode (e.g., change in status) of handling the incident; the data under the heading Time Between Activity Entries shows the duration of each episode of handling the incident; the data under the heading Priority shows the priority (e.g., medium, high, critical) assigned to each episode of handling the incident; the data under the heading Activity Status shows the activity status (e.g., Transfer, Working, On Hold, Concluded, Assigned, Final) that is applicable to the episode of handling the incident; the data under the heading Assigned Group shows the support group (e.g., wg1, wg2, wg3) assigned to handle the incident; the data under the heading Assigned Individual (e.g., wi1, wi2, . . . , wi6) identifies the entity or person who last modified or entered the data; and the data under the heading Assigned Group Costing Category shows the cost category (e.g., Low, Top, Medium, High) associated with the support group handling the incident.

It will be noted that method 200, at 232, may include making a distinct count of the assigned groups, a distinct count of each time the priority changed, and a distinct count of each status activity. For purposes of illustration these counts are shown in FIG. 3, for example, as footnotes 320 (e.g., 4 distinct counts of assigned groups, 2 conclusions, indicating re-work, 6 distinct counts of assigned individuals, and 1 count of first transfer time) to de-normalized data table 300.

With renewed reference to FIG. 2, at level three, method 200, after aggregating the incident handling data, may include, for each incident and each support tier, creating new de-normalized fields (e.g., Work, Waste, and Wait fields) in the incipient target data source characterizing incident handling behavior (240). The new de-normalized fields characterizing incident handling behavior may be based upon the newly created Audit log fields at level one.

The Work field may include a work attribute value based on a measurable effort expended to resolve the incident. In example implementations, the following work value definitions may be used:
  Original Work—measurable effort put forth to resolve incident prior to, and including the minimum Status=Resolved;
  Re-work—work performed after the first resolution status, up to and including the last resolution status. May include multiple resolution statuses; and
  Wasted Work—non-value added delay experienced by customer during incident processing.

The Wait field may include a wait attribute value based on measurable delay experienced by a customer while the incident is being processed. In example implementations, the following wait value definitions may be used:
  Service Wait—acceptable wait state; and
  Unserviceable Wait—excessive wait state.

Figure 4:
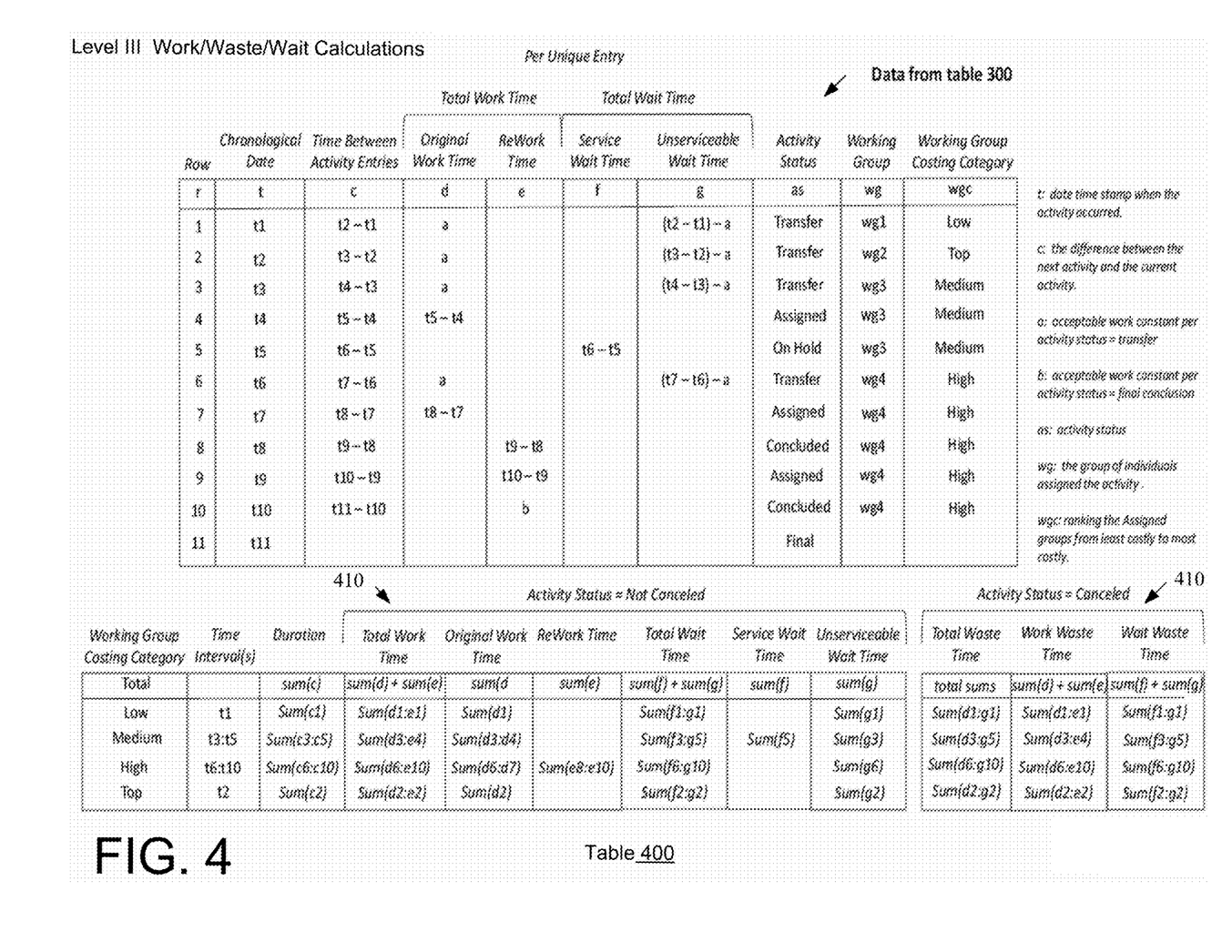
FIG. 4 is an illustration of an example de-normalized data table with the new de-normalized fields (e.g., Work, Waste, and Wait fields) characterizing incident handling behavior for an incident, in accordance with the principles of the present disclosure.

FIG. 4 shows an example de-normalized data table 400 with the new de-normalized fields (e.g., Work, Waste, and Wait fields) characterizing incident handling behavior for the incident identified in table 300. De-normalized data table 400 may be included in the target data source. De-normalized data table 400 may be prepared by aggregating and summarizing the data in de-normalized data table 300 through level three of method 200, in accordance with the principles of the present disclosure.

In addition to Working Group Costing Category, Time Intervals and Duration, de-normalized data table 400 may include one or more added "behavioral" de-normalized data fields 410. Example "behavioral" de-normalized data fields 410 (e.g., Total Work Time, Original Work Time, ReWork Time, Total Wait Time, Service Wait Time, Unserviceable Wait Time, Total Waste Time, Work Waste time, Wait Waste Time, etc.) are shown, for example, as column headings in table 400 in FIG. 4.

In de-normalized data table 400 shown for example in FIG. 4, the data under the heading Working Group Costing Category shows the costs (e.g., Low, Top, Medium, High) associated with the support groups handling the incident for the times (e.g., t1, t3:t5, etc.) shown under the heading Time Interval(s); the data under the heading Duration shows the duration that the support groups in Working Group Costing Category had assigned responsibility for handling the incident; the data under the heading Total Work Time shows the total time the support groups actually spent handling the incident prior to resolution of the incident; the data under the heading Original Work Time shows the time the support groups may have spent after being initially assigned the incident; the data under the heading ReWork Time shows the time the support groups may have spent after the incident was initially resolved, but reopened; the data under the heading Total Wait Time shows the time the incident was waiting to be worked on by the assigned support group; the data under the heading Service Wait may show how much of the waiting time was in a "pending" status (i.e., a reasonable wait time for a customer); and, conversely, the data under the headings Unserviceable Wait Time may show how much of the waiting time was not in a "pending" status (i.e., an unreasonable reasonable wait time for a customer).

Figure 5:
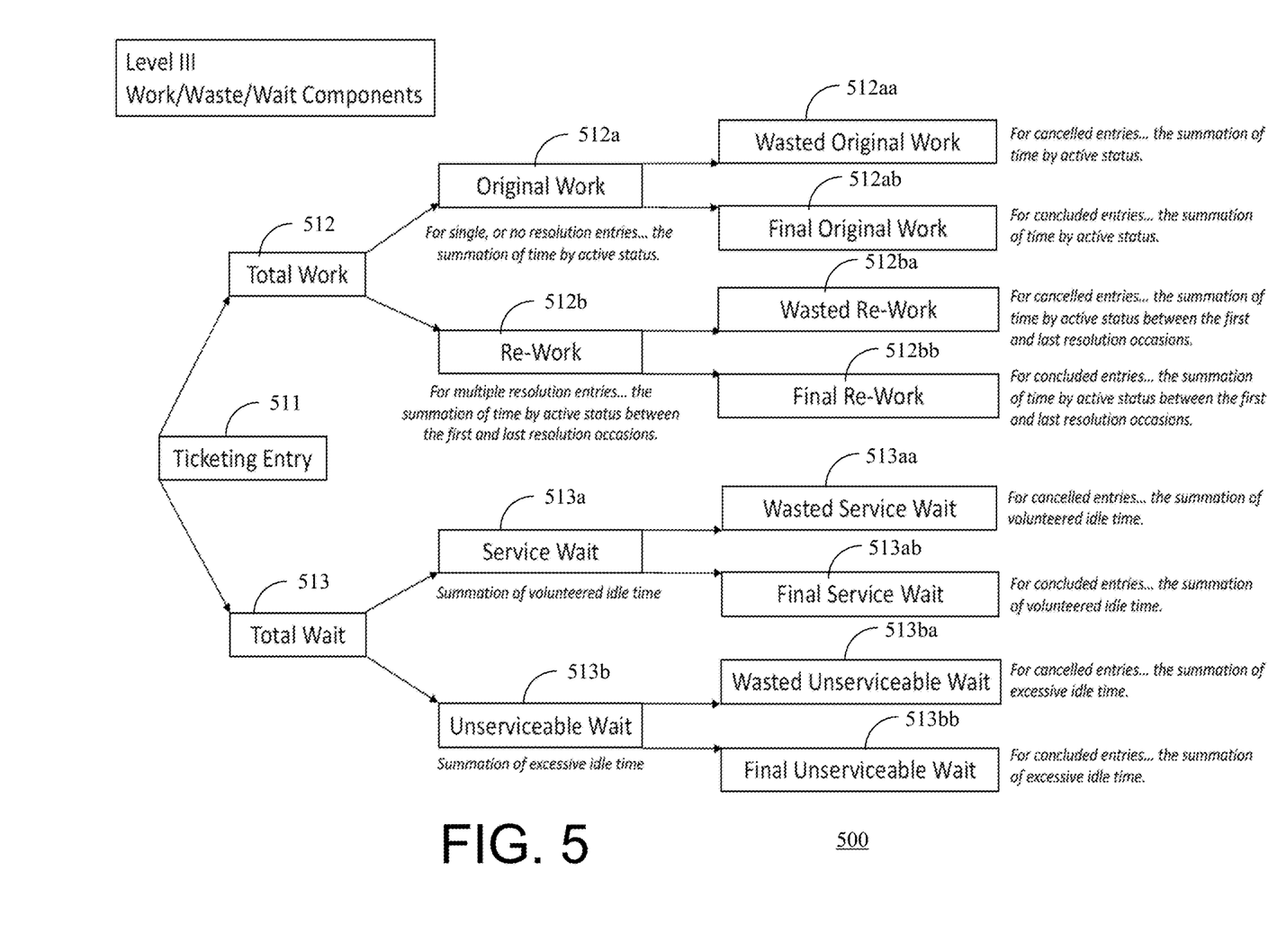
FIG. 5 is an illustration of an example algorithm that may be utilized in method of FIG. 2 to determine the time data values for de-normalized data fields (e.g., Duration, Total Work, Re-work, Original work, Total Wait, Service Wait, Unserviceable Wait, Wasted Work, Wasted Wait, etc.), in accordance with the principles of the present disclosure.

FIG. 5 shows an example algorithm 500 that may be utilized in method 200 to determine the time data values for de-normalized data fields 410 (e.g., Duration, Total Work, Re-Work, Original Work, Total Wait, Service Wait, Unserviceable Wait, Wasted Work, Wasted Wait, etc.), in accordance with the principles of the present disclosure.

Algorithm 500 may be used for each incident, beginning at Ticketing Entry 511, to determine the times for Total Work 512 and Total Wait 513 expended (e.g. by Assigned Groups) in the handling of the incident.

Determining the time for Total Work 512 may involve determining times for Original Work 512a, Wasted Original Work 512aa, Final Original Work 512ab, Re-Work 512b, Wasted Re-Work 512ba, and Wasted Re-Work 512bb.

The time for Original Work 512a may be, for single or no unresolved entries, determined by summation of time by active status. The time for Wasted Original Work 512aa may be determined, for cancelled entries, by summation of time by active status. The time for Final Original Work 512ab may be determined, for concluded entries, by summation of time by active status.

The time for Re-Work 512b may be determined, for multiple resolution entries, by summation of time by active status between the first and last resolution entries. The time for Wasted Re-Work 512ba may be determined, for cancelled entries, by summation of time between the first and last resolution occasions. The time for Re-Work 512bb may be determined, for concluded entries, by summation of time between the first and last resolution occasions.

Further, according to algorithm 500, determining the time for Total Wait 513 may involve determining times for Service Wait 513a, Wasted Service Wait 513aa, Final Service Wait 513ab, Unserviceable Wait 513b, Wasted Re-Work 513ba, and Wasted Re-Work 513bb.

The time for Service Wait 513a may be determined by summation of volunteered idle time. The time for Wasted Service Wait 513aa may be determined, for cancelled entries, by summation of volunteered idle time. The time for Final Original Work 513ab may be determined, for concluded entries, by summation of volunteered idle time.

The time for Unserviceable Wait 513b may be determined by summation of excessive idle time. The time for Unserviceable Wait 513ba may be determined, for cancelled entries, by summation of excessive idle time. The time for Final Unserviceable Wait 513bb may be determined, for concluded entries, by summation of excessive idle time.

De-normalized data table 400 may be included in the target data source. De-normalized data table 400 may be prepared by aggregating and summarizing the data in de-normalized data table 300 through level three of method 200, in accordance with the principles of the present disclosure.

With renewed reference to FIG. 2, at level four, method 200 may include analyzing the aggregated incident handling data to determine behavioral characteristics, and populating the target data source's de-normalized data fields with the aggregated incident handling data and behavioral characteristics (250).

Figure 6:
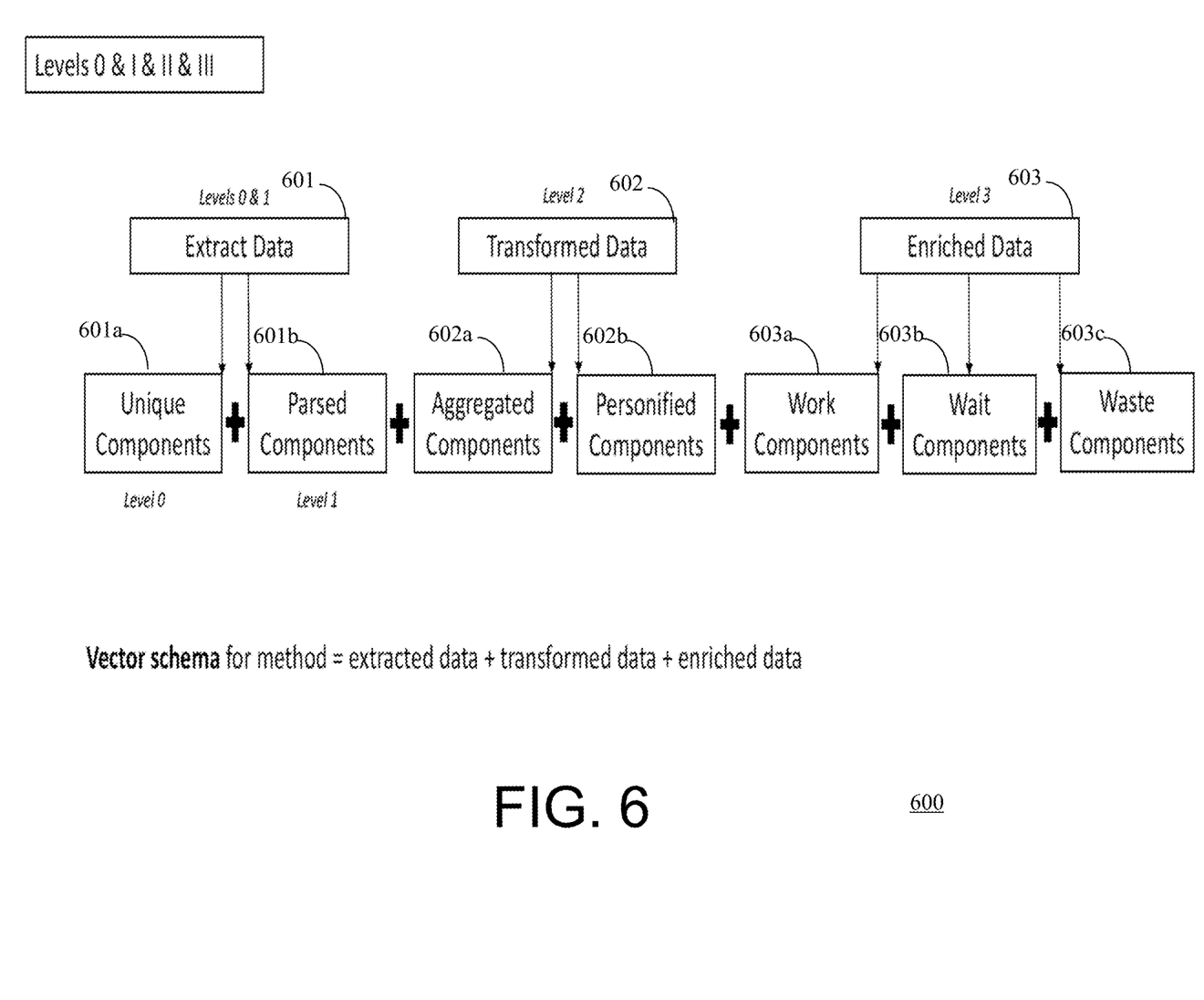
FIG. 6 is a schematic illustration of an example de-normalized vector schema of data that may be included by the method of FIG. 2 in the target data source, in accordance with the principles of the present disclosure.

FIG. 6 schematically shows an example de-normalized vector schema 600 of data that may be included by method 200 in the target data source, in accordance with the principles of the present disclosure. The data included in the target data source according to vector schema 600 may include extracted data components 601 (e.g., a unique component 601a and a parsed component 601b). Unique component 601a (e.g., incident identifiers) and parsed component 601b (e.g., Working Group, Priority, Status, Support Tier, etc.) may be obtained, for example, at level zero and level one by method 200. Vector schema 600 may further include transformed data components 602 (e.g., an aggregated component 602a, and a personified component 602b). Aggregated component 602a (e.g., a distinct count of each time the priority changed, and a distinct count of each status activity, etc.) and personified component 602b (e.g. distinct count of the assigned groups, assigned group escalation order etc.), may be obtained, for example, at level two by method 200. Vector schema 600 may further include enriched data components 603 (e.g., a Work component 603a, a Wait component 603b, and a Waste component 603c), which may describe behaviors of incident handling. Enriched data components 603 (e.g., a Work component 603a, a Wait component 603b, and a Waste component 603c) may be obtained, for example, at level three by method 200.

While method 200 has been described above using "Core" incident handling data as example ITSM data for behavioral analytics, it will be understood that method 200 and the business analytics techniques described herein are applicable to (or may be extended to include) other ITSM data categories (e.g. customer surveys, relationships, audit log, work log, etc.) in addition to the Core data. In example implementations, additional normalized incident data (in one-to-many relationship to the Core data may include Customer Surveys, Relationships, Audit Log, and Work Log portions of ITSM data.

Figure 7:
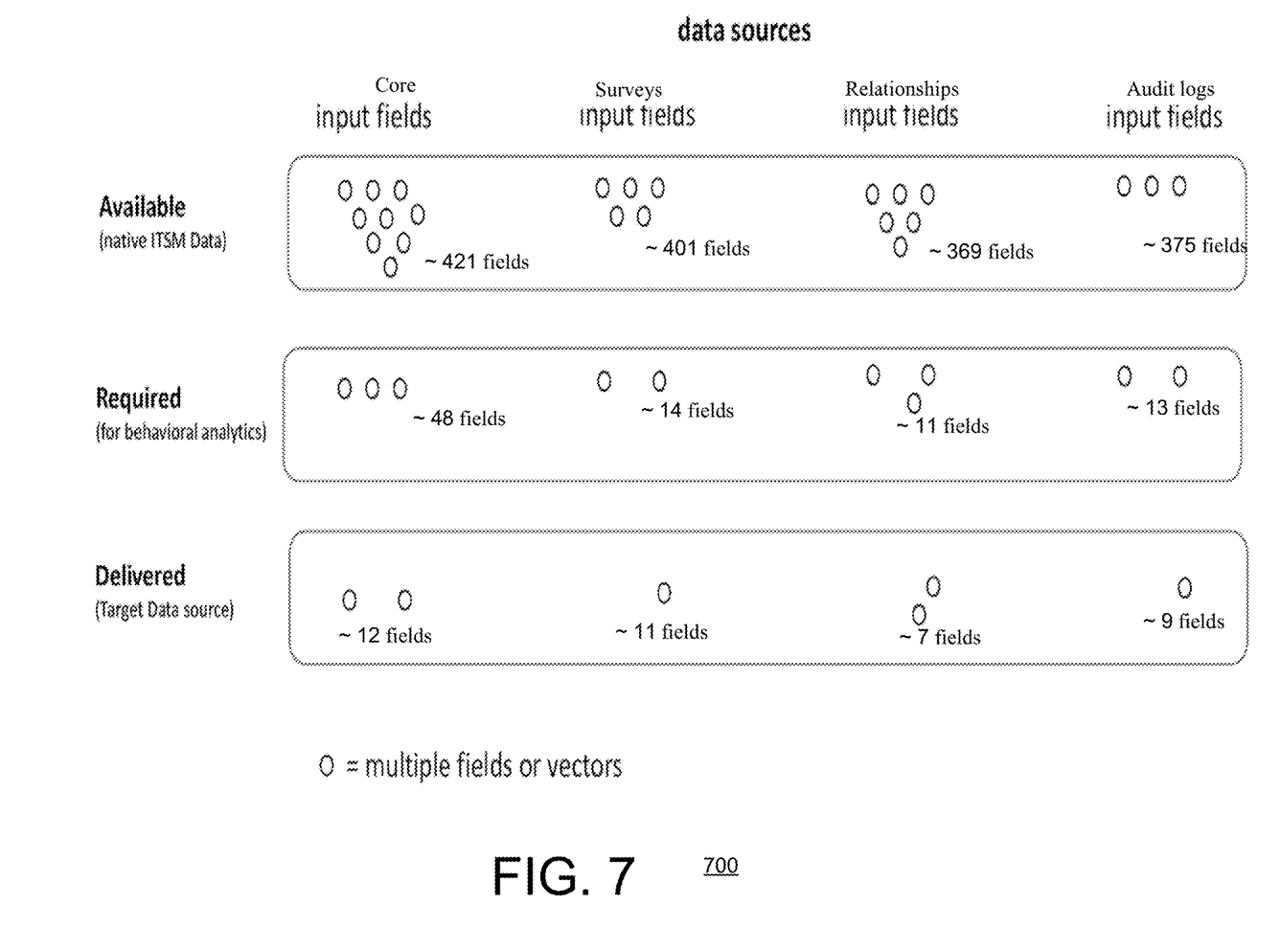
FIG. 7 is a schematic illustration of an example of the reduction in the number of data fields in the target data source compared to the number of data fields in the native ITSM data, in accordance with the principles of the present disclosure.

An aspect of method 200 and the business analytics techniques described herein is that the native ITSM data may be substantially reduced in size by aggregation and summation in the target data source (e.g., as de-normalized data table 400) for consumption by targets (i.e., other applications or systems). A measure of the reduction data size may be obtained by comparing the number of data fields in the native ITSM data and the number of data fields in the target data source. FIG. 7 schematically shows an example of the reduction in the number of data fields in the target data source compared to the number of data fields in the native ITSM data (e.g., for the data categories Core, Surveys, Relationships and Audit logs) in a example implementation of the behavioral analytics techniques described herein. In the example shown in FIG. 5, the native ITSM data in the data categories Core, Surveys, Relationships and Audit logs may have 421, 401, 369 and 375 (normalized) data fields, respectively. Of these only a few fields (e.g., 48, 14, 11 and 13 data fields, respectively) may be needed to prepare the respective target data sources for the data categories Core, Surveys, Relationships and Audit logs. Further, the respective target data sources for the data categories Core, Surveys, Relationships and Audit logs, which may be interfaced with other consuming "targets", may have, for example, only 12, 11, 7 and 9 data fields (including new normalized and de-normalized data fields), respectively.

An advantage of the small size of the target data sources (prepared using method 200 and the behavioral analytics techniques described herein) is that the small-sized data, which may have a small footprint, can be rapidly accessed and consumed by a variety of mediums (e.g., by target applications or systems). In an example implementation, the small-size target data sources (e.g., de-normalized data table 400) may be used to rapidly detect, for example, process inefficiencies in incident handling. For the incident handling behavior for an incident number (described above with reference to FIGS. 3 and 5). FIG. 8 shows an example view or report 800 of process inefficiencies that may be more rapidly obtained from de-normalized data table 300 and de-normalized data table 400 than from native ITSM data.

Figure 9:
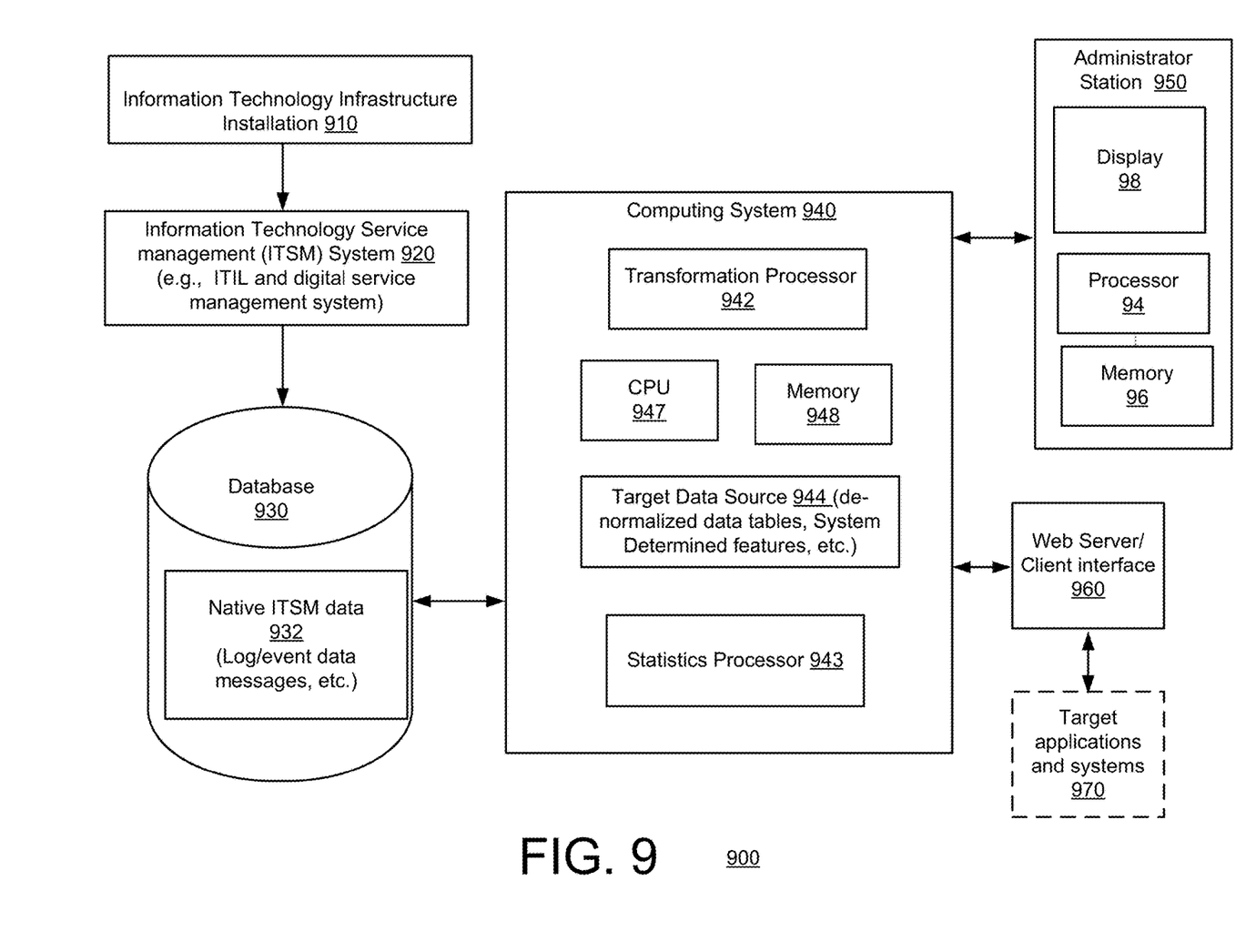
FIG. 9 is a block diagram illustration of an example system for behavioral analytics of ITSM data of an IT infrastructure installation, in accordance with the principles of the present disclosure.

FIG. 9 is a block diagram that illustrates an example system 900 for behavioral analytics of ITSM data of an IT infrastructure installation, in accordance with the principles of the present disclosure. The foregoing computer-implemented method 200 and behavioral analytic techniques described herein may, for example, be implemented using system 900.

System 900 may be coupled to an ITSM system 920 (e.g., an ITIL and digital management service) of an IT infrastructure installation 910. IT infrastructure installation 910 may include hardware, software (e.g., applications), network resources, services, and other components required for delivering IT solutions and services to users. ITSM system 920 may report management data (native ITSM data) generated in the operation and servicing of IT infrastructure installation 910. This reported data (including incident management data) may be stored, at least temporarily, for example, as native ITSM data 932 in a database 930.

System 900 may include a computing system 940 that is configured to conduct behavioral analytics of native ITSM data 932 (including, for example, incident management data) of IT infrastructure installation 910. Computing system 940 may be configured to transform at least a portion of the large and complex native ITSM data 932 by collecting, creating, enriching, and repackaging native ITSM data into a smaller size target data source (e.g., target data source 944) for behavioral analytics, in accordance with the principles of the present disclosure.

System 900, which may be hosted on one or more physical or virtual machines, may be accessible to, or connected to, a client computer (e.g., administrator station 950). Administrator station 950, which may be connected to computing system 940, may include a processor 94, a memory 96, and a display 98. An administrator may use computing system 940 to conduct behavioral analytics of native ITSM data 932 and to view results, for example, on display 98 of administrator station 950.

Computing system 940, in addition to a CPU 947 and a memory 948, may include one or more modules (e.g., transformation processor 942, and statistics processor 943, etc.) that include processes for collecting, creating, enriching, and repackaging large size native ITSM data into a smaller size target data source (e.g., target data source 944) for behavioral analytics. Target data source 944 may be persisted, for example, in memory 948 or other database (e.g., database 930), where it can be accessed (e.g., via client interface 960) and consumed by any of a variety of mediums (e.g., target applications and systems 970). Client interface 960 may be a web server interface between system 900 and remote target applications and systems 970.

Transformation processor 942 may utilize behavioral concepts (e.g., of work, wait and waste) to categorize incident handling processes (e.g., activities that may be supervised by support entities or help desk staff) in an ITSM.

In example implementations, transformation processor 942 may include processes or algorithms for aggregating and summarizing the portion of the large size native ITSM data 932 (e.g., Core incident handling data) into a small size target data source 944. The processes and algorithms may include processes and algorithms for collecting the portion of the native ITSM data 932 (e.g., from database 930) for the incipient target data source, creating, enriching, and repackaging the native ITSM data into the smaller size target data source (e.g., target data source 944) for behavioral analytics.

The portion of native ITSM data may, for example, contain normalized ITSM data (e.g., for both concluded and active functions within the incident lifecycles processed by the ITSM system). Transformation processor 942 may be configured to de-normalize (or in other words vectorize) the portion of native ITSM data (e.g., incident handling data). The de-normalized incident data may be aggregated and summarized and enriched to bring out behavioral characteristics of incident handling in the ITSM system. Transformation processor 942 may be configured to persist or store the aggregated and summarized data in memory (e.g., memory 948) or other database (e.g., database 930) as target data source 944).

System 900 may include a client interface (e.g., web server/client interface 960) that provides remote targets (e.g. target applications and systems 970) access to target data source 944. In an example implementation, computer system 940 may include a statistical processor (e.g., statistical processor 943) that is configured to further process target data source 944 for behavioral analytics, and to provide, for example, customized views, reports, presentations, or analysis of target data source 944 to an individual target (e.g. target applications and systems 970).

In example implementations of system 900, computer system 940 may be configured to dynamically update target data source 944 as native ITSM data 932 changes with time.

Figure 10:
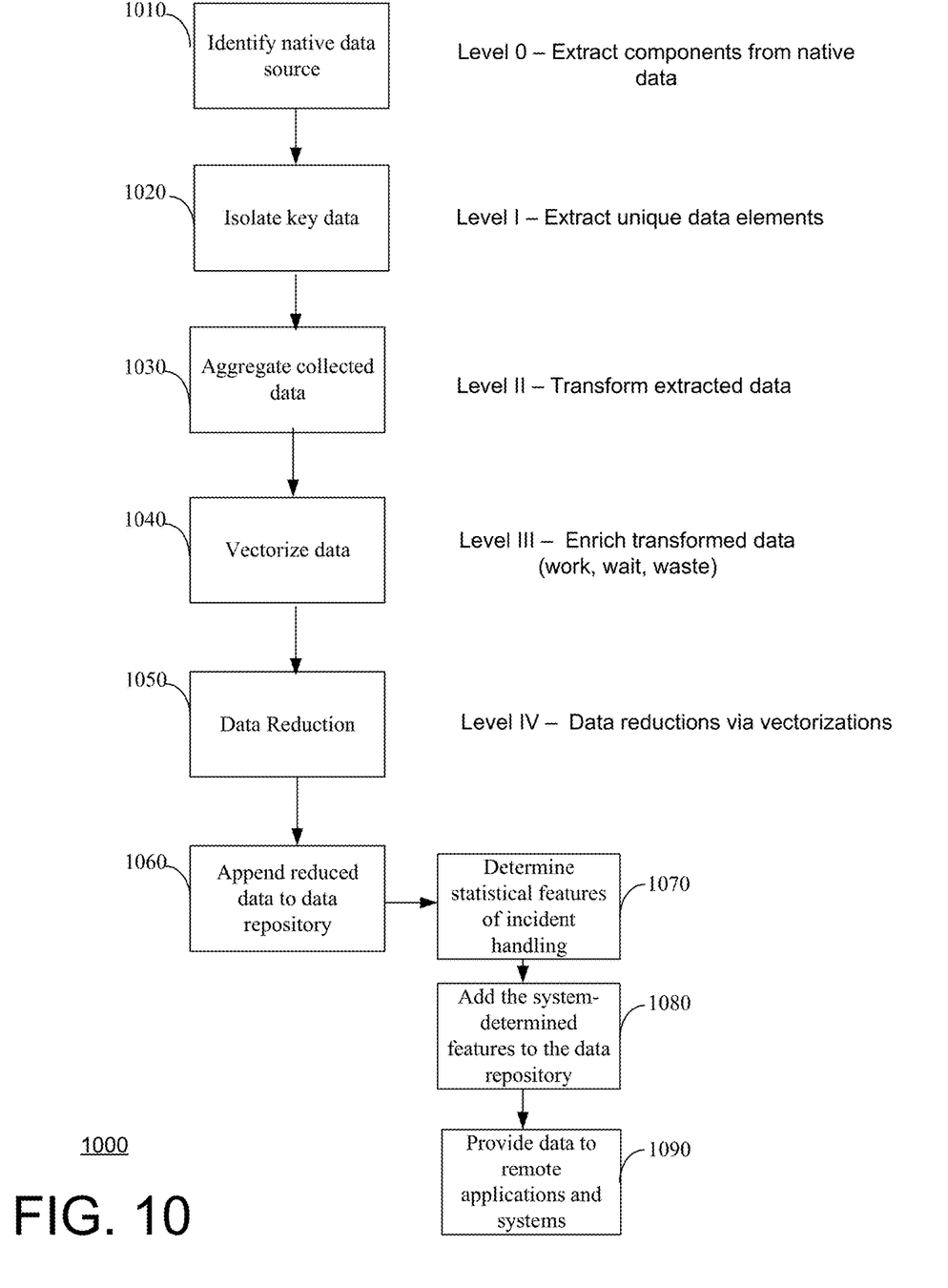
FIG. 10 is a flowchart illustrating an example method for iteratively determining distinct message patterns that can be used to condense or aggregate raw messages received in a given time interval, in accordance with the principles of the present disclosure.

FIG. 10 shows an example method 1000 that may be implemented using system 900 for providing behavioral analytics of large volumes incident management data as a digital service to clients, in accordance with the principles of the present disclosure.

Method 1000 may involve reducing the large volumes of the native incident management data to a small volume de-normalized target data set, determining behavioral characteristics of incident handling by statistical analysis of the de-normalized target data set, adding the determined behavioral characteristics of incident handling to the small volume de-normalized target data set, and providing data in the small volume de-normalized target data set to remote applications and systems via a web service client interface.

In an example implementation, method 1000 may include native identifying incident management data from its source (1010), isolating and collecting key data (1020), aggregating the collected data (1030); vectorizing the data (1040); reduce the data by vectorization (1050); and appending the reduced data to the target data source (1060).

Similar to method 200 described in the foregoing, in method 1000 identifying incident management data from its source 1010 may include extracting selected components from the native data; isolating and collecting key data 1020 may include extracting unique data enhancements; aggregating the collected data 1030 may include transforming the extracted data; and vectorizing the data 1040 may include enriching the transformed data with behavioral attributes (e.g., work, wait and waste).

Method 1000 may further include determining statistical features of incident handling by statistical analysis of the de-normalized target data source (1070), adding the system-determined features of incident handling to the small volume de-normalized target data set (1080), and providing data in the small volume de-normalized target data set (including system-determined behavioral features) to remote applications and systems via a client interface (e.g., a web service client interface) (1090).

In system 900, determining statistical features of incident handling by statistical analysis by statistical analysis of the de-normalized target data set 1060 may be performed by statistics processor 934. An example of the system-determined statistical features may be a view or a report (e.g. a report on incident handling process inefficiencies such as report 800 of process inefficiencies that is shown in FIG. 8).

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method for identifying aggregated wasted time across a plurality of incidents handled by a plurality of incident handlers in Information Technology (IT) incident handling, the method comprising:

identifying a volume of native IT Service Management (ITSM) data, the ITSM data including incident activity entries characterizing the IT incident handling for each incident of the plurality of incidents and each corresponding incident handler of the plurality of incident handlers;

creating a target data set that is reduced in size from the volume of native ITSM data, including adding at least one field for aggregated wasted time to the target data set, and including, for each incident of the plurality of incidents:

identifying time periods occurring between pairs of the incident activity entries, wherein each time period of the time periods is stored together with a plurality of incident activity characterizations, the plurality of incident activity characterizations including at least one status;

dividing at least one time period of the plurality of time periods into a first time division and a second time division, and aggregating, based on the at least one status, at least two time periods of the time periods into at least a first aggregated time period that includes the first time division, and a second aggregated time period that includes the second time division and a portion of the second time period;

classifying the first aggregated time period as wasted time;

classifying the second aggregated time period as work time or wait time;

adding the first aggregated time period to the at least one field for the aggregated wasted time to the target data set; and providing the target data set to remote applications and systems via a web service client interface, including providing access to the at least one field for the aggregated wasted time across the plurality of incidents and the plurality of incident handlers.

2. The method of claim 1, wherein the plurality of incident activity characterizations each include at least one of a priority, an activity status, an assigned group, and assigned individual, and an assigned group costing category.

3. The method of claim 1, wherein aggregating the at least two time periods includes selecting the at least two time periods for aggregation based on the corresponding incident activity characterizations of the at least two time periods.

4. The method of claim 1, wherein classifying the first aggregated time period as wasted time comprises:

classifying the second time division as work time or wait time;

classifying the portion of the second time period as work time or wait time;

classifying the second aggregated time period as total work time or total wait time;

classifying a remaining portion of the second time period as wasted time; and aggregating the first time division and the remaining portion of the second time period to determine the wasted time.

5. The method of claim 4, further comprising:

classifying the second aggregated time period as acceptable work time or acceptable wait time.

6. The method of claim 1, wherein classifying the first aggregated time period as wasted time comprises:

classifying the first aggregated time period as wasted time based on a combination of a first incident activity characterization and a second incident activity characterization of the at least two time periods.

7. A computer system for identifying aggregated wasted time across a plurality of incidents handled by a plurality of incident handlers in Information Technology (IT) incident handling, the computer system comprising:

a memory; and a transformation processor coupled to a statistical processor, the transformation processor in conjunction with the statistical processor configured to:

identify a volume of native IT Service Management (ITSM) data, the ITSM data including incident activity entries characterizing the IT incident handling for each incident of the plurality of incidents and each corresponding incident handler of the plurality of incident handlers;

create a target data set that is reduced in size from the volume of native ITSM data, including adding at least one field for aggregated wasted time to the target data set, and including, for each incident of the plurality of incidents:

identify time periods occurring between pairs of the incident activity entries, wherein each time period of the time periods is stored together with a plurality of incident activity characterizations, the plurality of incident activity characterizations including at least one status;

divide at least one time period of the plurality of time periods into a first time division and a second time division, and aggregating, based on the at least one status, at least two time periods of the time periods into at least a first aggregated time period that includes the first time division, and a second aggregated time period that includes the second time division and a portion of the second time period;

classify the first aggregated time period as wasted time;

classify the second aggregated time period as work time or wait time;

add the first aggregated time period to the at least one field for the aggregated wasted time to the target data set; and provide the target data set to remote applications and systems via a web service client interface, including providing access to the at least one field for the aggregated wasted time across the plurality of incidents and the plurality of incident handlers.

8. The computer system of claim 7, wherein the plurality of incident activity characterizations each include at least one of a priority, an activity status, an assigned group, and assigned individual, and an assigned group costing category.

9. The computer system of claim 7, wherein aggregating the at least two time periods includes selecting the at least two time periods for aggregation based on the corresponding incident activity characterizations of the at least two time periods.

10. The computer system of claim 7, wherein classifying the first aggregated time period as wasted time comprises:

classifying the second time division as work time or wait time;

classifying the portion of the second time period as work time or wait time;

classifying the second aggregated time period as total work time or total wait time;

classifying a remaining portion of the second time period as wasted time; and aggregating the first time division and the remaining portion of the second time period to determine the wasted time.

11. The computer system of claim 10, further comprising: classifying the second aggregated time period as acceptable work time or acceptable wait time.

12. The computer system of claim 7, wherein classifying the first aggregated time period as wasted time comprises: classifying the first aggregated time period as wasted time based on a combination of a first incident activity characterization and a second incident activity characterization of the at least two time periods.

13. A computer program product for identifying aggregated wasted time across a plurality of incidents handled by a plurality of incident handlers in Information Technology (IT) incident handling, including instructions recorded on a non-transitory computer-readable storage medium and configured to cause at least one processor to:
   identify a volume of native IT Service Management (ITSM) data, the ITSM data including incident activity entries characterizing the IT incident handling for each incident of the plurality of incidents and each corresponding incident handler of the plurality of incident handlers;
   create a target data set that is reduced in size from the volume of native ITSM data, including adding at least one field for aggregated wasted time to the target data set, and including, for each incident of the plurality of incidents:
   identify time periods occurring between pairs of the incident activity entries, wherein each time period of the time periods is stored together with a plurality of incident activity characterizations, the plurality of incident activity characterizations including at least one status;
   divide at least one time period of the plurality of time periods into a first time division and a second time division, and aggregating, based on the at least one status, at least two time periods of the time periods into at least a first aggregated time period that includes the first time division, and a second aggregated time period that includes the second time division and a portion of the second time period;
   classify the first aggregated time period as wasted time;
   classify the second aggregated time period as work time or wait time;
   add the first aggregated time period to the at least one field for the aggregated wasted time to the target data set; and
   provide the target data set to remote applications and systems via a web service client interface, including providing access to the at least one field for the aggregated wasted time across the plurality of incidents and the plurality of incident handlers.

14. The computer program product of claim 13, wherein the plurality of incident activity characterizations each include includes at least one of a priority, an activity status, an assigned group, and assigned individual, and an assigned group costing category.

15. The computer program product of claim 13, wherein aggregating the at least two time periods includes selecting the at least two time periods for aggregation based on the corresponding incident activity characterizations of the at least two time periods.

16. The computer program product of claim 13, wherein classifying the first aggregated time period as wasted time comprises:
   classifying the second time division as work time or wait time;
   classifying the portion of the second time period as work time or wait time;
   classifying the second aggregated time period as total work time or total wait time;
   classifying a remaining portion of the second time period as wasted time; and
   aggregating the first time division and the remaining portion of the second time period to determine the wasted time.

17. The computer program product of claim 16, further comprising:
   classifying the second aggregated time period as acceptable work time or acceptable wait time.

18. The computer program product of claim 13, wherein classifying the first aggregated time period as wasted time comprises:
   classifying the first aggregated time period as wasted time based on a combination of a first incident activity characterization and a second incident activity characterization of the at least two time periods.

* * * * *

UNITED STATES PATENT AND TRADEMARK OFFICE
CERTIFICATE OF CORRECTION

| | |
|---|---|
| PATENT NO. | : 11,657,063 B2 |
| APPLICATION NO. | : 15/476694 |
| DATED | : May 23, 2023 |
| INVENTOR(S) | : Pavon et al. |

It is certified that error appears in the above-identified patent and that said Letters Patent is hereby corrected as shown below:

On the Title Page

Column 1, Item (54), Line 3, and in the Specification Column 1, Line 3 delete "INFRASTURCTURE" and insert -- INFRASTRUCTURE --, therefor.

Signed and Sealed this
First Day of October, 2024

Katherine Kelly Vidal
*Director of the United States Patent and Trademark Office*